United States Patent
Agusti Costa et al.

(10) Patent No.: US 9,584,187 B2
(45) Date of Patent: Feb. 28, 2017

(54) NON-INTERRUPTIVE FILTERING OF TRANSMISSION LINE COMMUNICATIONS

(71) Applicant: Broadcom Corporation, Irvine, CA (US)

(72) Inventors: Oriol Agusti Costa, Barcelona (ES); Xavier Josep Reves Balleste, Barcelona (ES); Toby Edward Ralph Bailey, Innerleithen (GB)

(73) Assignee: BROADCOM CORPORATION, Irvine, CA (US)

( * ) Notice: Subject to any disclaimer, the term of this patent is extended or adjusted under 35 U.S.C. 154(b) by 715 days.

(21) Appl. No.: 13/919,976

(22) Filed: Jun. 17, 2013

(65) Prior Publication Data
US 2014/0105311 A1    Apr. 17, 2014

Related U.S. Application Data

(60) Provisional application No. 61/714,205, filed on Oct. 15, 2012.

(51) Int. Cl.
H04B 3/56    (2006.01)
H04B 3/54    (2006.01)

(52) U.S. Cl.
CPC ............... *H04B 3/56* (2013.01); *H04B 3/54* (2013.01)

(58) Field of Classification Search
CPC .................................. H04B 3/56; H04B 3/54
(Continued)

(56) References Cited

U.S. PATENT DOCUMENTS 8,174,335 B2 * 5/2012 Poveda Lerma ..... H01F 17/062
333/12
2001/0045888 A1 * 11/2001 Kline ...................... H04B 3/54
370/485
(Continued)

FOREIGN PATENT DOCUMENTS

CN    1279534 A    1/2001
CN    1695212 A    11/2005
(Continued)

OTHER PUBLICATIONS

"Domestic Electric Circuits", TutorVista.com, 2 pages.

*Primary Examiner* — Jared Fureman
*Assistant Examiner* — Emmanuel R Dominique
(74) *Attorney, Agent, or Firm* — McDermott Will & Emery LLP (57) ABSTRACT

Systems and methods according to aspects of the subject technology provide non-interruptive filtering of transmission line communications. The non-interruptive filtering may physically isolate, in the frequency domain, independent networks that share a common transmission media, such as mains wires that are used to deliver both alternating current (AC) power and power line communication signals. The isolation provided by the non-interruptive filtering prevents the transmissions from the independent networks from interfering with each other. In one or more implementations, the non-interruptive filtering may be provided by one or more filters that include cores, such as ferrite cores, around which two mains wires, e.g. a mains live wire and a mains neutral wire, can be wound in opposite directions, respectively. Currents traveling on the mains wires through the filter in opposite phases cancel each other out, thereby blocking symmetric power line transmissions, while allowing AC power to pass through.

21 Claims, 5 Drawing Sheets

(58) Field of Classification Search
USPC .............................................................. 307/1
See application file for complete search history.

(56) References Cited

U.S. PATENT DOCUMENTS

| | | | | |
|---|---|---|---|---|
| 2003/0224784 A1* | 12/2003 | Hunt | ........................ | H04B 3/54 455/426.2 |
| 2004/0036478 A1* | 2/2004 | Logvinov | ................ | H04B 3/54 324/534 |
| 2005/0007241 A1* | 1/2005 | Kline | ........................ | H04B 3/54 370/464 |
| 2005/0015805 A1* | 1/2005 | Iwamura | .................. | H04B 3/54 725/79 |
| 2006/0165117 A1* | 7/2006 | Iwamura | .................. | H04B 3/54 370/464 |
| 2008/0129438 A1* | 6/2008 | Lee | ........................... | H01F 1/26 336/220 |
| 2012/0177133 A1* | 7/2012 | Oldenkamp | ............ | H04B 3/54 375/257 |
| 2012/0210695 A1 | 8/2012 | Travis | | |
| 2013/0156116 A1* | 6/2013 | Sim | ........................ | H04B 3/56 375/257 |

FOREIGN PATENT DOCUMENTS

| | | |
|---|---|---|
| CN | 203522735 U | 4/2014 |
| EP | 2290834 A1 | 3/2011 |
| JP | 2006-115481 A | 4/2006 |
| JP | 2007-129721 A | 5/2007 |
| JP | 2008-228022 A | 9/2008 |

* cited by examiner

NON-INTERRUPTIVE FILTERING OF TRANSMISSION LINE COMMUNICATIONS

CROSS-REFERENCE TO RELATED APPLICATIONS

The present application claims the benefit of U.S. Provisional Patent Application Ser. No. 61/714,205, entitled "Non-Interruptive Filtering of Mains on Consumer Unit Side," filed on Oct. 15, 2012, which is hereby incorporated by reference in its entirety for all purposes.

TECHNICAL FIELD

The present description relates generally to filtering, and more particularly, but not exclusively, to a non-interruptive filtering of transmission line communications.

BACKGROUND

Power line communication (PLC) systems carry data on a conductor that is also used simultaneously for AC electric power transmission or electric power distribution. Power line communications systems operate by impressing a modulated carrier signal on the wiring system. For example, power line communications may be used by an Internet service provider (ISP) to distribute Internet service throughout a building, such as an apartment building. The ISP may install primary power line communication devices for each apartment in a common area of the apartment building, such as a basement. The primary power line communication devices may be coupled to an external Internet connection. The primary power line communication devices may also be coupled to internal power lines that provide power to each apartment. For example, the internal power lines may be coupled to a common power line that provides power to the apartment building. Secondary power line communication devices may be installed in each apartment and communicatively coupled to the primary communication devices via the internal power lines. The primary power line communication devices may distribute the Internet connection over the internal power lines to the secondary power line communication devices, and the secondary power line devices distribute the Internet to networked devices throughout each apartment.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

Figure 1:
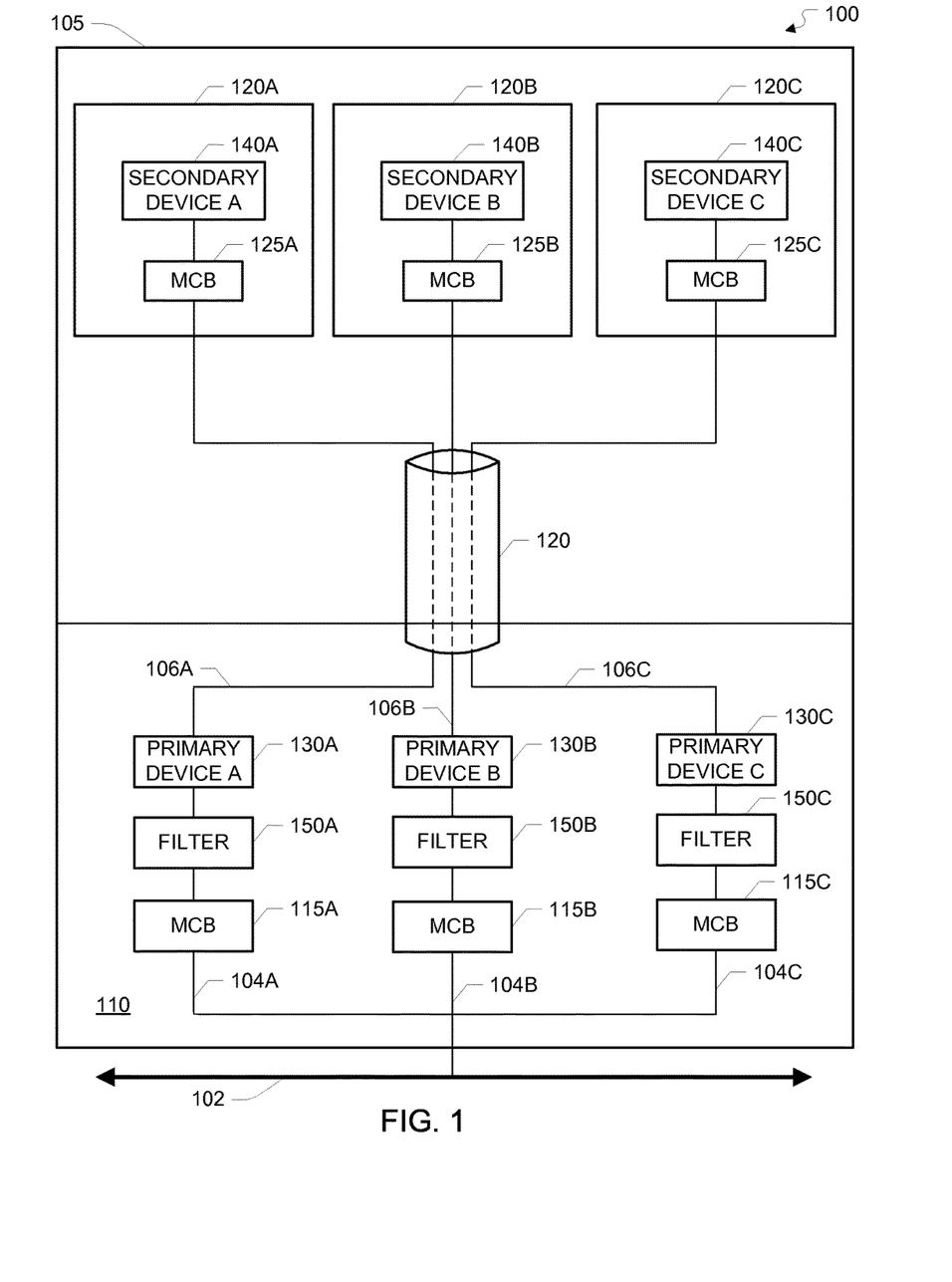
FIG. 1 illustrates an example power line network environment in which a system for non-interruptive filtering of transmission line communications may be implemented in accordance with one or more implementations.

FIG. 1 illustrates an example power line network environment 100 in which a system for non-interruptive filtering of transmission line communications may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

The power line network environment 100 includes a common power line 102, and a building 105, such as an apartment building, an office building, or generally any building for which it may be desirable to communicatively couple devices over power lines. The building 105 may include a common area 110, such as a basement or a utility closet, one or more units 120A-C, such as apartments, offices, condominiums, etc., and internal power lines 106A-C that run from the common area 110 to the units 120A-C, and that are bundled through a tube 120. The common area 110 may include mains power lines 104A-C that are coupled to the common power line 102, mini-circuit breakers (MCBs) 115A-C, filters 150A-C, and primary devices 130A-C. The units 120A-C may include mini-circuit breakers (MCBs) 125A-C, and secondary devices 140A-C.

The mains power lines 104A-C, the internal power lines 106A-C, and the common power line 102 may be any cables or wires that can carry electricity, such as wires made of copper or other conductors, and may be referred to as power cables, power lines, electrical power lines, electrical wiring, electrical cabling, etc. The mains power lines 104A-C, the internal power lines 106A-C, and/or the common power line 102 may each include multiple wires that can carry current, such as a live wire, a neutral wire, and/or a ground wire that may also be referred to as a protective earth wire. For example, the mains power lines 104A-C, the internal power lines 106A-C, and/or the common power line 102 may each include a live wire that carries an electrical current from the electricity source, such as an electrical provider, and a neutral wire that provides the return path for the electrical current. The tube 120 may be any conduit that is capable of routing the internal power lines 106A-C from the common area 110 to the units 120A-C.

The MCBs 115A-C, 125A-C may be any circuit breakers, e.g. automatically operated electrical switches designed to protect electrical circuits from damage caused by overload or short circuit. The basic function of the MCBs 115A-C, 125A-C may be to detect a fault condition and interrupt current flow. Once triggered, the MCBs 115A-C, 125A-C can be reset (either manually or automatically) to resume normal operation.

The primary devices 130A-C and the secondary devices 140A-C may be any devices that are capable of coupling a data signal onto the internal power lines 106A-C, such as power line communication devices or power line modems. For example, the primary devices 130A-C and the secondary devices 140A-C may be configured to impress a modulated carrier signal onto the internal power lines 106A-C. The primary devices 130A-C and the secondary devices 140A-C may use different carrier frequencies to communicate with one another, e.g. depending on the signal transmission characteristics of the internal power lines 106A-C. The carrier frequencies may differ from the power frequency current, e.g. 50-60 Hertz. In one or more implementations, the primary devices 130A-C and the secondary devices 140A-C may transmit symmetrical differential power line communication signals across multiple wires, e.g. across a live wire and a neutral wire. Thus, a first power line communication signal may be transmitted over the live wire and a second power line communication signal that is an inverse of the first signal may be transmitted over the neutral wire, e.g. the first and second signals may have opposite phases. Any of the primary devices 130A-C and/or the secondary devices 140A-C may have a transmission port that is shared with an alternating current (AC) power port. In one or more implementations, the primary devices 130A-C may be communicatively coupled to an Internet connection, and the secondary devices 140A-C may be communicatively coupled to local area networks within the units 120A-C.

In operation, the primary devices 130A-C may communicate with the secondary devices 140A-C, respectively, over the internal power lines 106A-C, respectively. Thus, the primary device 130A may transmit/receive first power line communication signals to/from the secondary device 140A over the internal power line 106A, e.g. forming a first local power line network, the primary device 130B may transmit/receive second power line communication signals to/from the secondary device 140B over the internal power line 106B, e.g. forming a second local power line network, and the primary device 130C may transmit/receive third power line communication signals to/from the secondary device 140C over the internal power lines 106C, e.g. forming a third local power line network. The first, second, and third local power line networks may be configured to be independent of each other; however the first, second, and third local power line networks may be communicatively coupled to the common power line 102.

Since the primary devices 130A-C each share a common AC feeding point, e.g. the common power line 102, the power line communication signals transmitted/received by the primary devices 130A-C may interfere with one another, e.g. by leaking out to the common power line 102 and/or the mains power lines 104A-C. However, any such interference can be mitigated by implementing the filters 150A-C that block the power line communication signals while allowing AC power to pass through. For example, the filter 150A blocks the power line communication signals of the primary devices 130B-C from passing through to the primary device 130A, the filter 150B blocks the power line communication signals of the primary devices 130A,C from passing through to the primary device 130B, and the filter 150C blocks the power line communication signals of the primary devices 130A-B from passing through to the primary device 130C. Thus, the filters 150A-C physically isolate the first, second, and third local power line networks in the frequency domain, thereby allowing the primary devices 130A-C to reuse the same frequencies and improving bandwidth efficiency An example process for isolating the local power line networks is discussed further below with respect to FIG. 4.

The filters 150A-C may be any filters that can be implemented without breaking the continuity of the power lines 104A-C, 106A-C, e.g. a filter that can be inserted after the MCBs 115A-C. For example, the filters 150A-C may be ferrite cores and/or may be toroidal shaped. An example toroidal shaped filter is discussed further below with respect to FIG. 3. In one or more implementations, the live and neutral wires of the mains lines 104A-C may be wound through the filters 150A-C, respectively, in opposite directions. Since the live wire and the neutral wire may carry symmetric differential signals, e.g. signals having opposite phases, the currents travelling on each wire will induce a current on the other wire that will result in a substantial cancellation of the signals on each wire, thereby blocking the power line communication signals over the mains lines 104A-C by an amount of decibels that does not comprise the performance of the primary devices 130A-C due to interference, while still allowing the AC power to pass through to the primary devices 130A-C. The number of times that the live and neutral wires are wound through the filters 150A-C may be based at least in part on the core materials of the filters 150A-C and/or the diameters of the filters 150A-C. Examples of wires wound through filters are discussed further below with respect to FIGS. 2 and 5.

For explanatory purposes, the power line network environment 100 of FIG. 1 is illustrated and discussed in the context of the units 120A-C that are located within a building 105. However, the subject system for non-interruptive filtering of transmission line communications is not limited to units that are located within a common building. The subject system for non-interruptive filtering of transmission line communications may implemented in any environment where multiple primary devices 130A-C are coupled to a common AC feeding point, such as the common power line 102. For example, the primary devices 130A-C may be located in separate buildings, such as separate houses, that are coupled to a common power line 102. Alternatively, or in addition, the subject system may be used to isolate data networks over a shared wired transmission media, such as to isolate networks within rooms in flats or houses; isolate networks between different customer premises; and/or isolate distribution networks of service providers that distribute data to subscribers within a building.

Further for explanatory purposes, the subject system for non-interruptive filtering of transmission line communications is discussed in the context of providing isolation for power line networks. However, the subject system may be used to provide network isolation of any networks that share a common physical conducted media. The network isolation may be independent of any modulation schemes and independent of any associated standards or specifications. Accordingly, the non-interruptive filtering of the subject system may be extended to other conducted transmission media such a single ended lines, coaxial lines, phone line twisted pairs, Ethernet over twisted pairs, etc.

Figure 2:
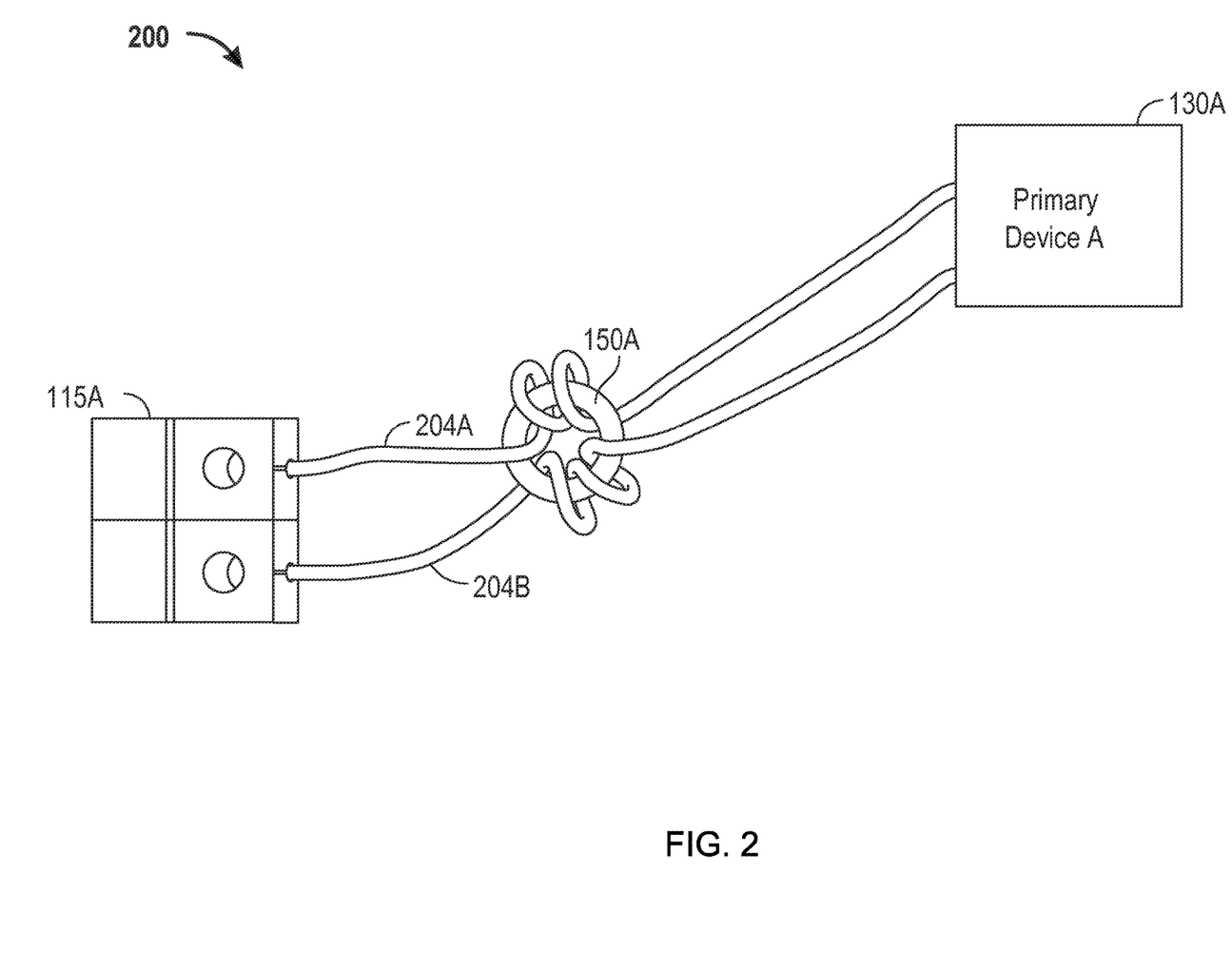
FIG. 2 illustrates an example power line network environment in which a system for non-interruptive filtering of transmission line communications may be implemented in accordance with one or more implementations.

FIG. 2 illustrates an example power line network environment 200 in which a system for non-interruptive filtering of transmission line communications may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

The example power line network environment 200 includes an MCB 115A, a filter 150A, a mains live wire 204A, a mains neutral wire 204B, and a primary device 130A. The filter 150A may have a toroidal shape and may define, or include, an orifice, or opening. An example filter having a toroidal shape is discussed further below with respect to FIG. 3. The filter 150A may be inserted into the power line network environment 200 between the MCB 115A and the primary device 130A. The filter 150A may be inserted by winding the mains live wire 204A and the mains neutral wire 204B through the orifice of the filter 150A in opposite directions. In this manner, the symmetric power line communication signals over the mains live wire 204A and the mains neutral wire 204B are cancelled by the induced currents of opposite phases, while asymmetric transmissions over the mains live wire 204A and the mains neutral wire 204B are unaffected. An example process for winding the mains live and neutral wires 240A-B around the filter 150A is discussed further below with respect to FIG. 5.

Accordingly, since the filter 150A can be easily inserted into the example power line network environment 200 without having to alter, cut, or change, the mains wires 204A-B, the filter 150A provides non-interruptive filtering of the any power line communications transmitted over the mains wires 204A-B, such as communications from the primary devices 130B-C. The filter 150A may provide a cost-effective filtering solution that has reduced dimensions and that does not alter or compromise safety, e.g. the safety may be already met by the mains wires 204A-B that are not altered. Furthermore, the filter 150A can be used in balanced and unbalanced transmission media, e.g. parallel lines, single ended lines, coaxial lines, twisted pair lines, mains wires, etc.

Figure 3:
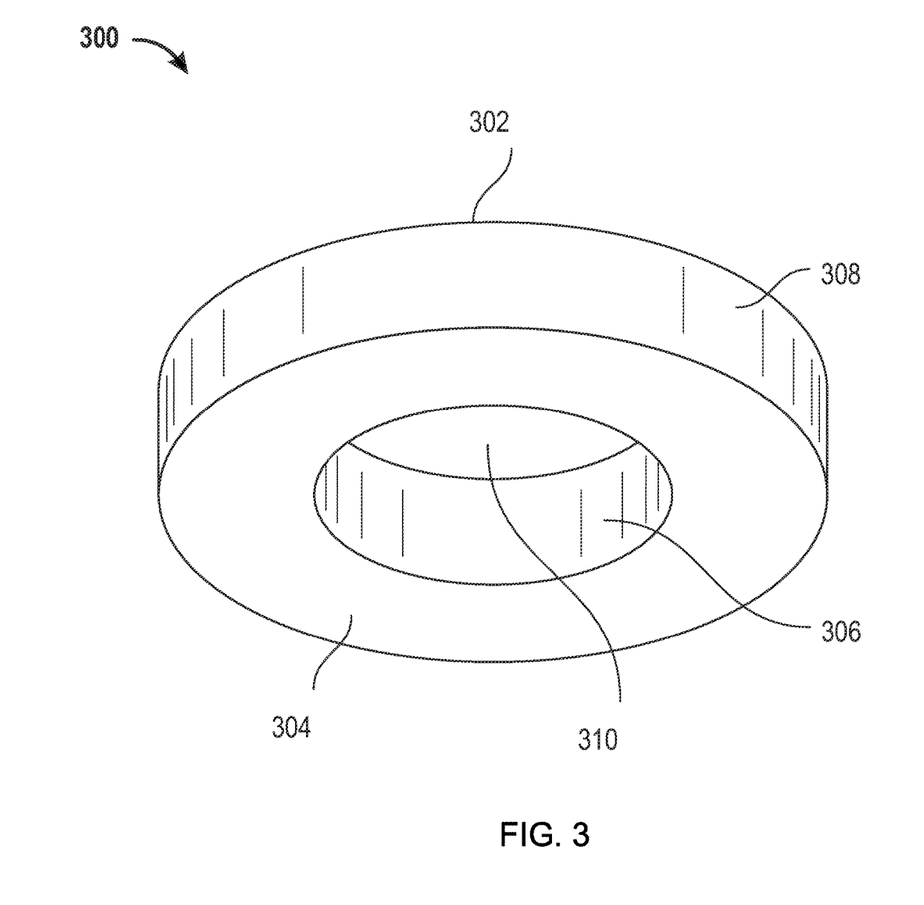
FIG. 3 illustrates an example non-interruptive transmission line filter in accordance with one or more implementations.

FIG. 3 illustrates an example non-interruptive transmission line filter 300 in accordance with one or more implementations. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

The non-interruptive transmission line filter 300 is toroidal-shaped and includes a first surface 302, a second surface 304, an inside perimeter surface 306, and an outside perimeter surface 308. The first and second surfaces 302, 304 are disc shaped and include openings that, in combination with the inside perimeter surface 306, define an orifice 310 that extends through the non-interruptive transmission line filter 300. The non-interruptive transmission line filter 300 is characterized by a height that is defined by the distance between the first surface 302 and the second surface 304, an inside diameter that is defined by the diameter of the orifice 310, and an outside diameter that is defined by the diameter of the first surface 302 and/or the second surface. In one or more implementations, the non-interruptive transmission line filter 300 may include solid material, e.g. solid ferrite material, between the first and second surfaces 302, 304.

As previously discussed, the mains live wire 204A and the mains neutral wire 204B of FIG. 2 may be wound through the orifice 310 and around the filter 150A in opposite directions. In one or more implementations, the mains live wire 204A and the mains neutral wire 204B may be wound around the filter 150A an equal number of turns that may be determined based at least in part on the material of the filter 150A, the inside diameter of the filter 150A, and/or the outside diameter of the filter 150B. Thus, coupling may exist between the coils formed around the filter 150A by the mains live wire 204A and the mains neutral wire 204B. The material of the filter 150A, the inside diameter, and/or the outside diameter may have an impact on bandwidth and therefore, due to bandwidth requirements of power line communications, the filter 150A may be, or may include, a ferrite core or ferrite toroid, since these objects enclose magnetic fields efficiently and therefore have a larger bandwidth of operation.

In one or more implementations, the filter 150A may be, or may include, ferrite shapes that may have lower magnetic flux linkage than a ferrite core or ferrite toroid, although the effective operational bandwidth may be reduced. For example, the filter 150A may include circular and/or hexagonal cylinder-like shapes, and a single cylinder may be placed on the mains live wire 204A and the mains neutral wire 204B. The mains live wire 204A and the mains neutral wire 204B may then be wound on the cylinder without magnetic coupling, such that the bandwidth is sufficient for, e.g., 200 megabit per second (Mbps) power line applications.

In one or more implementations, the filter 150A may be implemented through air coils that are wound using the live and mains neutral wires 204A-B. However, an increased number of turns may be needed to achieve the required inductance and therefore longer wiring may be needed. In addition, a higher number of turns may cause a lower bandwidth to be realized.

Figure 4:
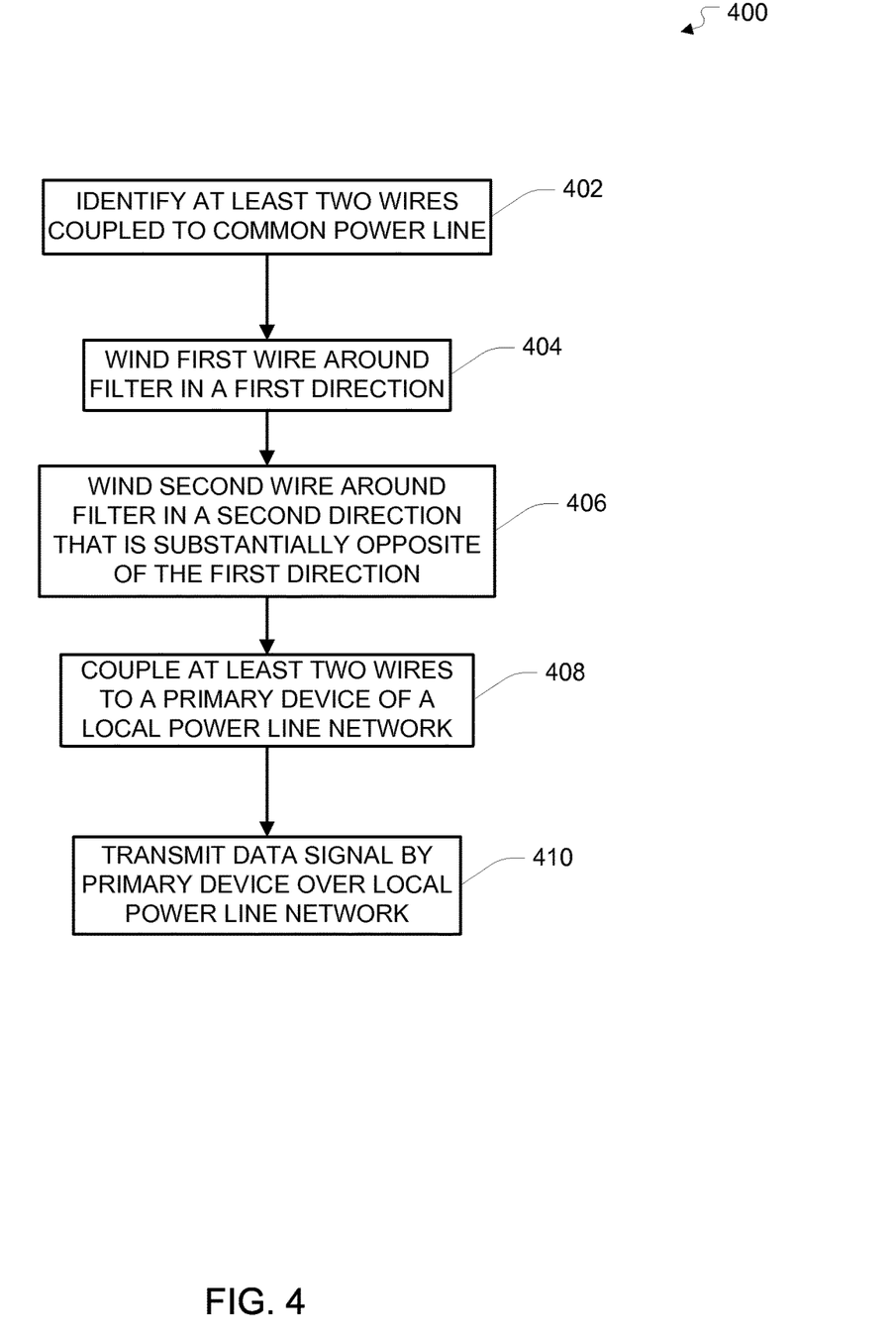
FIG. 4 illustrates a flow diagram of an example process of non-interruptive filtering of transmission line communications in accordance with one or more implementations.

FIG. 4 illustrates a flow diagram of an example process 400 of non-interruptive filtering of transmission line communications in accordance with one or more implementations. For explanatory purposes, example process 400 is described herein with reference to the example power line network environments 100 and 200 of FIGS. 1 and 2; however, example process 400 is not limited to the example power line network environments 100 and 200 of FIGS. 1 and 2. Further for explanatory purposes, the blocks of example process 400 are described herein as occurring in serial, or linearly. However, multiple blocks of example process 400 may occur in parallel. In addition, the blocks of example process 400 need not be performed in the order shown and/or one or more of the blocks of example process 400 need not be performed.

At least two wires that are coupled to a common power line 102 are identified (402), such as a mains live wire 204A and a mains neutral wire 204B. The first wire, e.g. the mains live wire 204A, is wound around a filter 150A a number of times in a first direction (404) and the second wire, e.g. the mains neutral wire 204B, is wound around the filter 150B the same number of times in a second direction that is substantially opposite of the first direction (406). The at least two wires are communicatively coupled to a primary device 130A of a local power line network (408). Data signals, e.g. power line communication signals, are transmitted by the primary device 130A over the first local power line network (410). Since the filter 150A allows AC power to pass through to the primary device 130A, but blocks power line communication signals from other primary devices 130B-C that are coupled to the common power line 102, the primary device 130A does not experience interference from power line communication signals transmitted by the other primary devices 130B-C.

Figure 5:
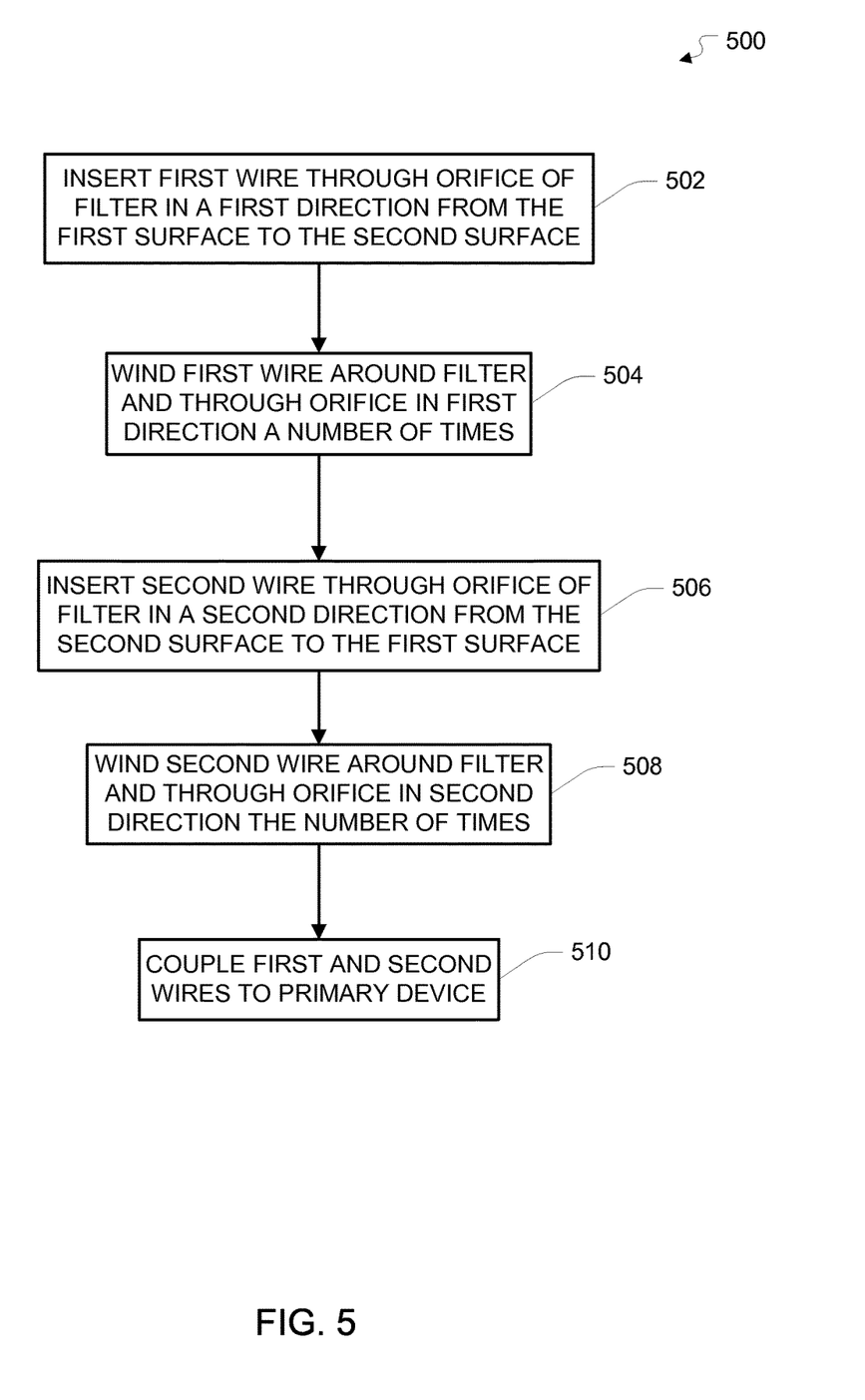
FIG. 5 illustrates a flow diagram of an example process for implementing a non-interruptive transmission line filter in accordance with one or more implementations.

FIG. 5 illustrates a flow diagram of an example process 500 for implementing a non-interruptive transmission line filter in accordance with one or more implementations. For explanatory purposes, example process 500 is described herein with reference to the example non-interruptive transmission line filter 300 of FIG. 3; however, example process 500 is not limited to the example non-interruptive transmission line filter 300 of FIG. 3. Further for explanatory purposes, the blocks of example process 500 are described herein as occurring in serial, or linearly. However, multiple blocks of example process 500 may occur in parallel. In addition, the blocks of example process 500 need not be performed in the order shown and/or one or more of the blocks of example process 500 need not be performed.

A first wire of a mains line 104A that is coupled to a common power line 102, such as the mains live wire 204A, is inserted through an orifice 310 of the non-interruptive transmission line filter 300 in a first direction from the first surface 302 to the second surface 304 (502). The first wire is wound around the non-interruptive transmission line filter 300 and through the orifice 310 in the first direction a number of times (504), such as three times.

A second wire of the mains line 104A, such as the mains neutral wire 204B, is inserted through the orifice 310 of the non-interruptive transmission line filter 300 in a second direction from the second surface 304 to the first surface 302 (506). Thus, the second direction is substantially opposite of the first direction. The second wire is wound around the non-interruptive transmission line filter 300 and through the orifice 310 in the second direction the number of times (508). Thus, the first wire and the second wire are wound around the non-interruptive transmission line filter 300 and through the orifice 310 the same number of times, but in opposite directions. The first and second wires of the mains line 104A are communicatively coupled to a primary device 130A (510). The non-interruptive transmission line filter 300 allows AC power to pass through to the primary device 130A but blocks power line communication signals from passing through to the primary device 130A. Thus, the primary device 130A may transmit power line communication signals, e.g. to the secondary device 140A over the internal power line 106A, without experiencing interference from any other primary devices 130B-C that are communicatively coupled to the common power line 102.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A power line communication (PLC) network filtering system, comprising:
    a first communication device coupled to a common power line via a first plurality of wires and configured to couple a first data signal on a first power line network;
    a second communication device coupled to the common power line via a second plurality of wires and configured to couple a second data signal on a second power line network; and
    a first filter coupled between the first communication device and the common power line, wherein the first filter is configured to pass alternating current (AC) power over the common power line to the first communication device and block the second data signal from passing over the common power line to the first communication device, wherein the first filter comprises a toroid-shaped core, a first wire of the first plurality of wires being passed through an orifice of the toroid-shaped core and wound around the toroid-shaped core in a first direction and a second wire of the first plurality of wires being passed through the orifice of the toroid-shaped core and wound around the toroid-shaped core in a second direction that is substantially opposite from the first direction.

2. The PLC network filtering system of claim 1, further comprising:
    a second filter coupled between the second communication device and the common power line, wherein the first filter is configured to pass alternating current (AC) power over the common power line to the second communication device and block the first data signal from passing over the common power line to the second communication device.

3. The PLC network filtering system of claim 2, wherein the first plurality of wires are wrapped around the first filter and the second plurality of wires are wrapped around the second filter.

4. The PLC network filtering system of claim 1, wherein the toroid-shaped core comprises a first disc-shaped surface and a second disc-shaped surface that are coupled by an inside perimeter surface and an outside perimeter surface, the inside perimeter surface defining the orifice that passes through the toroid-shaped core.

5. The PLC network filtering system of claim 4, wherein the first direction is through the orifice from the first disc-shaped surface to the second disc-shaped surface, and the second direction is through the orifice from the second disc-shaped surface to the first disc-shaped surface.

6. The PLC network filtering system of claim 1, wherein the first wire of the first plurality of wires comprises a live power wire and the second wire of the first plurality of wires comprises a neutral power wire.

7. The PLC network filtering system of claim 1, wherein the toroid-shaped core comprises ferrite.

8. A method for non-interruptive filtering on a power line network, the method comprising:
    coupling a first communication device to a common power line via a plurality of power wires, wherein the common power line is further coupled to a second communication device; and
    wrapping the plurality of power wires around a filter comprising a toroid core by passing a first power wire of the plurality of power wires through an orifice of the toroid core in a first direction from a first surface of the toroid core to a second surface of the toroid core, and a second power wire of the plurality of power wires through the orifice of the toroid core in a second direction from the second surface of the toroid core to the first surface of the toroid core, the second direction being substantially opposite from the first direction and the second surface being opposite from the first surface.

9. The method of claim 8, wherein the first communication device is configured to couple a power line communication (PLC) signal onto the plurality of power wires.

10. The method of claim 8, wherein the filter is configured to pass alternating current (AC) power to the first communication device and to block a power line communication (PLC) signal generated by the second communication device from the first communication device.

11. The method of claim 8, wherein the toroid core comprises ferrite.

12. The method of claim 8, wherein the coupling the first communication device to the common power line via the plurality of power wires further comprises coupling the plurality of power wires to a circuit breaker and coupling the circuit breaker to the common power line.

13. A power line communication (PLC) network, comprising:
    first and second power line communication devices; and
    a filter coupled between the first and second power line communication devices, wherein the filter is configured to pass alternating current (AC) power and to block a power line communication (PLC) signal and an inverse of the PLC signal generated by one of the first or second power line communication devices from the other one of the first or second power line communication devices by cancelling the PLC signal with the inverse of the PLC signal.

14. The PLC network of claim 13, wherein the first and second power line communication devices are coupled to a common power line.

15. The PLC network of claim 14, wherein the first power line communication device is coupled to the common power line via a plurality of power wires that are wrapped around the filter.

16. The PLC network of claim 15, wherein the first power line communication device is configured to couple the PLC signal onto the plurality of power wires.

17. The PLC network of claim 15, wherein the filter comprises a toroid-shaped core, a first power wire of the plurality of power wires that carries the PLC signal is wound around the toroid-shaped core in a first direction, and a second power wire of the plurality of power wires that carries the inverse of the PLC signal is wound around the toroid-shaped core in a second direction that is substantially opposite from the first direction.

18. The PLC network of claim 17, wherein the first power wire of the plurality of power wires comprises a live wire and the second power wire of the plurality of power wires comprises a neutral wire.

19. The method of claim 8, wherein the first surface of the toroid core comprises a first disc-shaped surface and the second surface of the toroid core comprises a second disc-shaped surface.

20. The PLC network filtering system of claim 1, wherein the first data signal comprises a first modulated signal that is transmitted over the first wire of the first plurality of wires and a second modulated signal that is transmitted over the second wire of the first plurality of wires, the second modulated signal being an inverse of the first modulated signal.

21. The PLC network of claim 15, wherein the filter comprises a toroid-shaped core, a first power wire of the plurality of power wires passes through an orifice of the toroid-shaped core and is wound around the toroid-shaped core in a first direction and a second power wire of the plurality of power wires passes through the orifice of the toroid-shaped core and is wound around the toroid-shaped core in a second direction that is substantially opposite from the first direction.

* * * * *